US012623437B2

(12) United States Patent　　(10) Patent No.: US 12,623,437 B2
Restrepo et al.　　　　　　　　(45) Date of Patent: May 12, 2026

(54) SACRIFICIAL BOND COMPOSITES AND USES THEREOF

(71) Applicants: Vanessa Restrepo, Bryan, TX (US); Oscar Ojeda, Bogotá D.C. (CO)

(72) Inventors: Vanessa Restrepo, Bryan, TX (US); Oscar Ojeda, Bogotá D.C. (CO)

( * ) Notice: Subject to any disclaimer, the term of this patent is extended or adjusted under 35 U.S.C. 154(b) by 185 days.

(21) Appl. No.: 18/339,801

(22) Filed: Jun. 22, 2023

(65) Prior Publication Data

US 2023/0415452 A1　　Dec. 28, 2023

Related U.S. Application Data

(60) Provisional application No. 63/354,423, filed on Jun. 22, 2022.

(51) Int. Cl.
| | |
|---|---|
| *B32B 7/12* | (2006.01) |
| *B32B 7/08* | (2019.01) |
| *B32B 37/12* | (2006.01) |
| *C09J 189/00* | (2006.01) |

(52) U.S. Cl.
CPC .................. *B32B 7/12* (2013.01); *B32B 7/08* (2013.01); *B32B 37/12* (2013.01); *C09J 189/00* (2013.01); *C09J 2301/206* (2020.08); *C09J 2301/208* (2020.08)

(58) Field of Classification Search
CPC .. B32B 7/12; B32B 7/08; B32B 37/12; B32B 2405/00; C09J 189/00; C09J 189/005; C09J 189/02; C09J 189/04; C09J 189/06; C09J 2301/206; C09J 2301/208; C08L 89/00; C08L 89/005; C08L 89/02; C08L 89/04; C08L 89/06; C09D 189/00; C09D 189/005; C09D 189/02; C09D 189/04; C09D 189/06

See application file for complete search history.

(56) References Cited

U.S. PATENT DOCUMENTS

2019/0000254 A1*　1/2019　Puthillath ............ D06N 7/0071

OTHER PUBLICATIONS

Li et al., "Magnet-induced Deformation Enhanced Adhesion based on Magneto-Responsive Polymer: Theoretical Analysis and Experimental Verification", Materials and Design vol. 194, pp. 108905 (Year: 2020).*
Salimi et al., "Composite Polyurethane Adhesives that Debond-on-Demand by Hysteresis Heating in an Oscillating Magnetic Field", European Polymer Journal vol. 121 p. 109264 (Year: 2019).*
Restrepo et al., "Bioinspired Fabrication of Reconfigurable Elastomeric Cementitious Structures using Self-Healing Mechanical Adhesives Interfaces", Materials and Design vol. 205, pp. 109691 (Year: 2021).*

(Continued)

*Primary Examiner* — Scott R. Walshon
(74) *Attorney, Agent, or Firm* — Benjamin Aaron Adler

(57) ABSTRACT

Monostable adhesive interfaces, for example, a sacrificial bond interface, and self-repairing composite materials are a layered assembly of magnetic materials and deformable adhesive materials such as a non-linear adhesive material and/or a mechanical adhesive. Also there is a method for constructing a sacrificial bond composite material and the sacrificial bond composite material constructed by the method.

11 Claims, 7 Drawing Sheets

(56)     References Cited

OTHER PUBLICATIONS

Park et al, "Water-Responsive Materials for Sustainable Energy Applications", J. Material Chemistry A vol. 8, p. 15227 (Year: 2020).*
D'Elia et al. "Autonomous Self-Healing Structural Composites with Bio-Inspired Design", Scientific Reports 6: 25059, doi 10.1038/srep25059 (Year: 2016).*

* cited by examiner

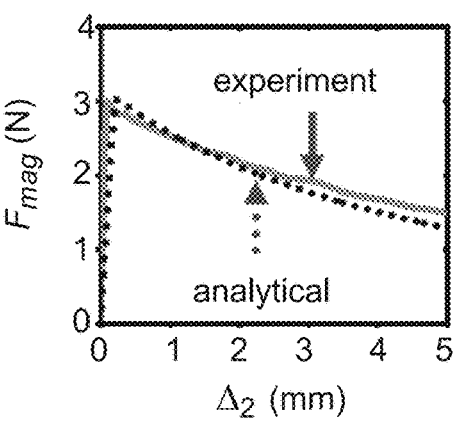
FIG. 4A
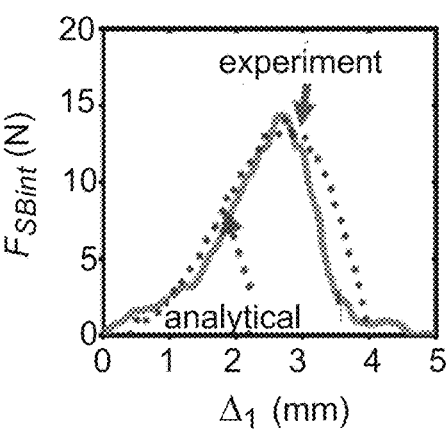
FIG. 4B
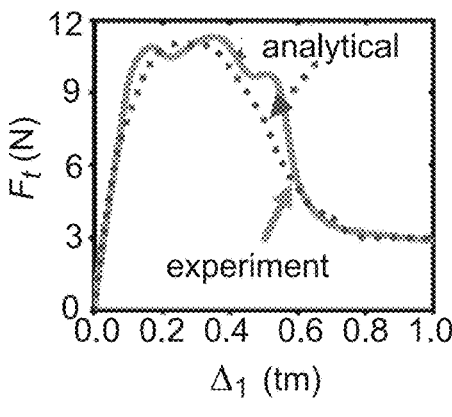
FIG. 4C
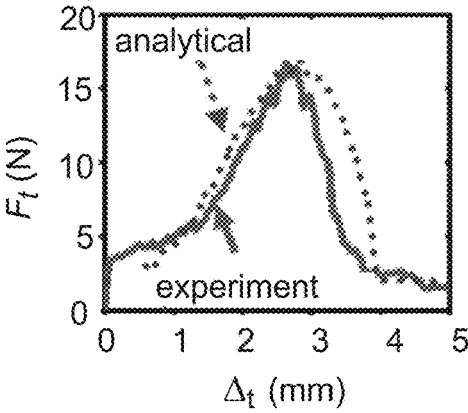
FIG. 4D
FIG. 4E

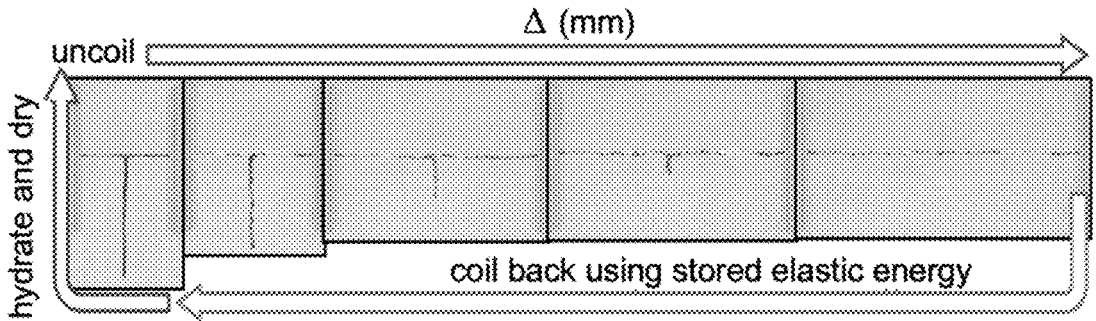
FIG. 6C
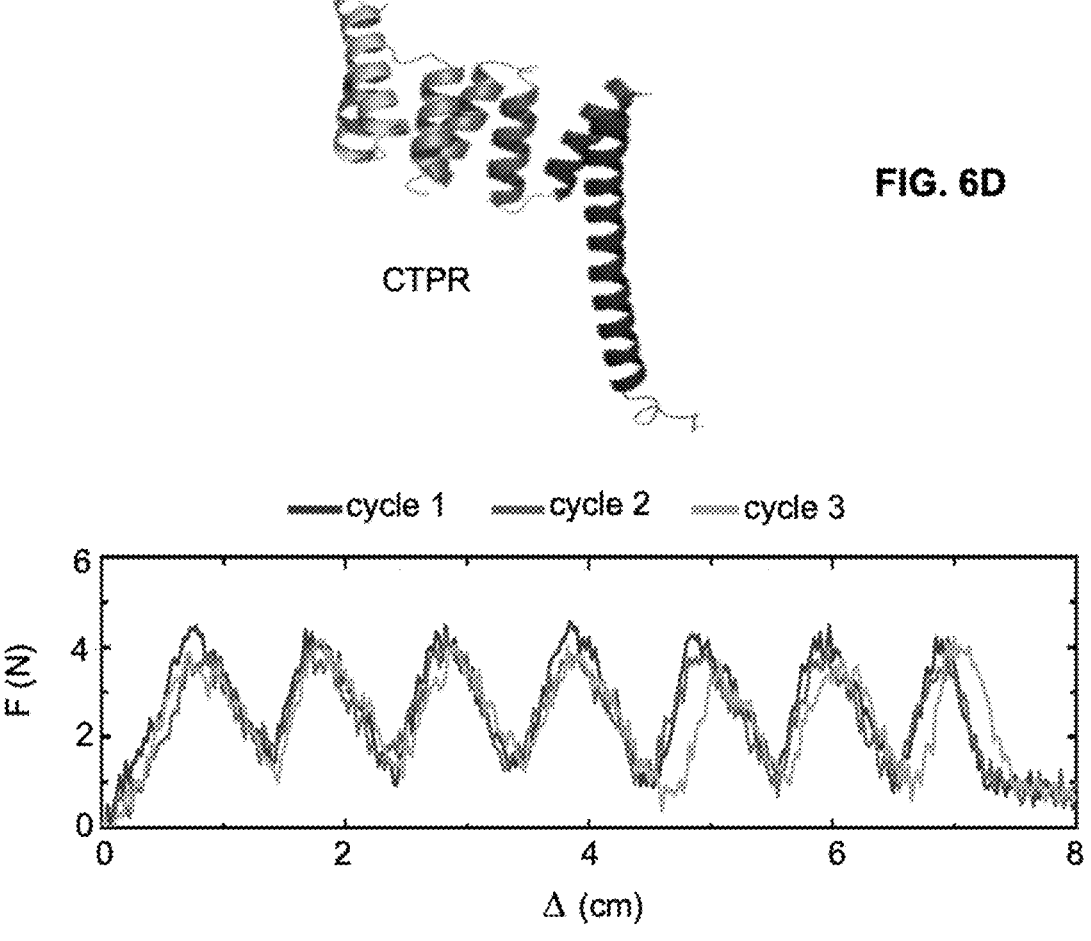
FIG. 6D
CTPR
FIG. 6E

SACRIFICIAL BOND COMPOSITES AND USES THEREOF

CROSS-REFERENCE TO RELATED APPLICATIONS

This patent application claims benefit of priority under 35 U.S.C. § 119(e) of provisional application U.S. Ser. No. 63/354,423, filed Jun. 22, 2022, the entirety of which is hereby incorporated by reference.

BACKGROUND OF THE INVENTION

Field of the Invention

The present invention relates generally to the fields of sacrificial bond materials and composite materials formed from the same. Specifically, the present invention relates to a cross-scale sacrificial bond composite material.

Description of the Related Art

Evolution has led to the development of natural materials and structures whose mechanical properties allow them to endure extreme conditions (1-3). Unfortunately, replicating such performance in artificial systems requires the combination of mutually exclusive mechanical properties, such as strength and toughness (4-6). Nacre, for example, is a multilayered brick-and-mortar natural material 3000 times more resistant to fracture than its constituents: microscale platelets of aragonite (95 vol %) bonded by a soft organic adhesive (5 vol %) (7-9). Studies of the mechanism behind the high toughness of nacre demonstrated that its organic adhesive consists of long proteins with sacrificial bonds that break sequentially upon the application of external loads, efficiently dissipating energy (10,11). Moreover, broken sacrificial bonds in nacre can automatically self-repair in the presence of moisture, imparting nacre with self-healing properties (12,13).

Self-assembled proteins use ionic, covalent, and metal-ligand bonds as sacrificial bonds to maximize their ability to organize their structure in stable and closely packed configurations (14-17). These bonds significantly increase the amount of energy required to unfold the protein and, since they can be re-formed multiple times, allow self-assembled proteins to not only dissipate significant energy during their unfolding, but also to reconfigure their self-assembled state afterwards (13,18).

Several bio-inspired studies have exploited the concept of protein unfolding to improve the performance of composite materials (2,14,19). For example, polyelectrolyte multilayer composites have been demonstrated to be able to break and to reform their electrostatic bonds, increasing the energy required to fail under shear loads and achieving partial self-healing after fractures (20). Similarly, coiled polycarbonate microfibers with internal welded points operating as sacrificial bonds were embedded into polydimethylsiloxane (PDMS) to demonstrate that elastomers are capable of exhibiting high energy dissipation and large inelastic deformation (21). While the use of sacrificial bonds as a bioinspired toughening and self-repairing mechanism is well understood at small scales, reproducing this mechanism at the mesoscale remains a challenge that currently limits the applicability of sacrificial bond composites (22).

Mechanical adhesive interfaces, such as hook-and-loop fasteners, have been widely employed in engineering and medical applications benefiting from rapid, dry, flexible, and reusable connections (23-25). As an example, mechanical adhesive interfaces have been incorporated into reconfigurable, nacre-inspired structural composites able to self-heal after enduring severe bidirectional loading forces (26). Additionally, under external loads, the continuous detachment of the hook-and-loop bonds across mechanical adhesive interfaces allows the effective distribution of forces across the interface, promoting energy dissipation (26,27). To recover the strength of the mechanical adhesive interface after its delamination, the interface needs to be re-assembled, so the hook-and-loop bonds can be reformed. The amplitude of the motion required to reassemble mechanical adhesive interfaces currently limits their application in the field of autonomous self-healing composites (28).

Thus, there is a need in the art for improved composites with self-healing properties. Specifically, the prior art is deficient in cross-scale composites with self-repairing interfaces based on sacrificial bonds. The present invention fulfills this longstanding need and desire in the art.

SUMMARY OF THE INVENTION

The present invention is directed to a monostable adhesive interface. The interface comprises a set of adhesive layers each deformable upon application of an external load and self-assembling upon removal thereof.

The present invention is further directed to a self-repairing composite material. The self-repairing composite material comprises a layered assembly of at least one deformable adhesive material and a magnetic material.

The present invention is directed further to a method for constructing a sacrificial bond composite material. In this method, a sacrificial bond interface is prepared and a magnetic material and the sacrificial bond interface are arranged into a plurality of alternating layers. The present invention is directed to a related method further comprising incorporating the sacrificial bond composite material into or onto a textile or other composite material.

The present invention is directed further still to a sacrificial bond composite material constructed by the method described herein.

Other and further aspects, features, and advantages of the present invention will be apparent from the following description of the presently preferred embodiments of the invention. These embodiments are given for the purpose of disclosure.

BRIEF DESCRIPTION OF THE DRAWINGS

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

FIGS. 1A-1B are schematics describing the role of sacrificial bonds in the energy dissipation density of proteins with similar amino acid sequences. Proteins with sacrificial bonds exhibit characteristic "sawtooth" force-extension curves, where peaks correspond to broken sacrificial bonds that allow the unfolding of their hidden length. This sequential unfolding increases the energy dissipation density (area under the curve) of sacrificial bond-based interfaces. FIGS. 1C-1D are schematics of a mechanical adhesive interface showing how the mechanical response of the nanoscale unfolding of proteins with sacrificial bonds can be recreated, at the mesoscale, by mechanical adhesive interfaces with reconfigurable hook-and-loop bonds.

FIG. 2A shows from left to right, scanning electron microscopy images and transmission electron microscopy image of the adhesive biopolymer fibrils bonding two aragonite platelets in nacre upon deformation. The platelets are ~400 nm-thick. The biopolymer fibrils can lengthen up to ~600 nm (32). FIG. 2B shows the dependence of the extension between two aragonite platelets on the applied force measured using an atomic force microscope (32). FIGS. 2C-2D show a mesoscale sacrificial bond composite combining a self-assembling protein-based interface with the magnetic attraction between two embedded magnets. After the protein-based interface separates, the force exerted by the magnets brings the interface together, starting the self-repairing process at room temperature. FIGS. 2E-2F show a mesoscale sacrificial bond composite combining a mechanical adhesive interface with the magnetic attraction of two embedded magnets. The sacrificial bond-based interfaces of the sacrificial bond composites in FIG. 2C and FIG. 2E are 40 mm long and 24.5 mm wide.

FIG. 3A is a schematic representation of sacrificial bond-based interfaces featuring sacrificial bonds fabricated with self-assembling proteins or mechanical adhesives. When sandwiched between two opposite-facing parallel magnets, the total force ($F_t$) required to separate these non-linear interfaces is the sum of the force required to stretch and break the sacrificial bonds at the interface ($F_{SBint}$) and the magnetic force from the magnets ($F_{mag}$). FIG. 3B illustrates that stacking multiple linear interfaces leads to a saw-tooth response.

FIGS. 4A-4E show the mechanical characterization of sacrificial bond composites for a single sacrificial bond-based interface with the magnetic recovery force generated by the opposite-facing magnets (FIG. 4A), for a sacrificial bond-based interface fabricated using self-assembling proteins (FIG. 4B), for a combination of the protein-based interface shown in FIG. 4B with the magnetic recovery shown in FIG. 4A (FIG. 4C), with a mechanical adhesive interface (FIG. 4D) and with a combination of the mechanical adhesive interface shown in FIG. 4D with the magnetic recovery shown in FIG. 4A (FIG. 4E). All interfaces are 40 mm long and 24.5 mm wide.

FIG. 5A is a protein-based sacrificial bond composite. FIG. 5B is a mechanical adhesive-based sacrificial bond composite. Non-stretchable threads were used to transfer tensile forces between adjacent interfaces while maintaining all layers parallel during the test.

FIGS. 6A-6E show the fabrication of textiles with high energy dissipation. FIG. 6A shows a fall arrester using a mechanical adhesive-based SBC. This system effectively dissipates approximately 1.5 J. The rapid reconfiguration of the fall arrester facilitates its reusability. FIG. 6B shows force-displacement curves of the fall arrester system after three loading cycles. FIG. 6C shows a two-ply yarn of polyester and cotton impregnated with CTPR exposed by a cycling tensile test along the horizontal axis. FIG. 6D shows the structure of the self-assembling CTPR protein solution sprayed over the polyester-cotton yarn. FIG. 6E are force-displacement curves of the polyester-cotton-CTPR yarn after three loading cycles.

DETAILED DESCRIPTION OF THE INVENTION

Figure 1A:
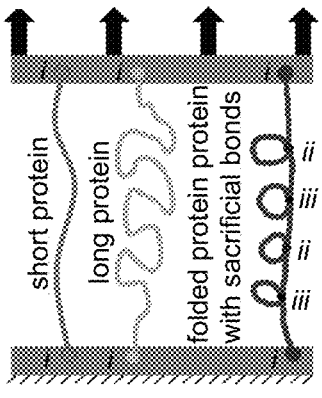
FIGS. 1A-1D show a force-extension response of sacrificial bond-based interfaces.

As used herein, the articles "a" and "an" when used in conjunction with the term "comprising" in the claims and/or the specification, may refer to "one", but it is also consistent with the meaning of "one or more", "at least one", and "one or more than one". Some embodiments of the invention may consist of or consist essentially of one or more elements, components, method steps, and/or methods of the invention. It is contemplated that any composition, component or method described herein can be implemented with respect to any other composition, component or method described herein.

As used herein, the term "or" in the claims refers to "and/or" unless explicitly indicated to refer to alternatives only or the alternatives are mutually exclusive, although the disclosure supports a definition that refers to only alternatives and "and/or".

As used herein, the terms "comprise" and "comprising" are used in the inclusive, open sense, meaning that additional elements may be included. The terms "consists of" and "consisting of" are used in the exclusive, closed sense, meaning that additional elements cannot be included. Use of "comprise" or "comprising" in a claim does not preclude changing or amending to "consists of" or "consisting of".

As used herein, the term "including" is used herein to mean "including, but not limited to". "Including" and "including, but not limited to" are used interchangeably.

As used herein, the conditional language, such as, among others, "can", "might", "may", "e.g.", "for example", and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

In one embodiment of the present invention, there is provided a monostable adhesive interface, comprising a set of adhesive layers each deformable upon application of an external load and self-assembling upon removal thereof.

In this embodiment, each adhesive layer in the set may be a sacrificial bond interface comprising at least one of a self-assembling protein or a mechanical adhesive. In one aspect of this embodiment, a representative self-assembling protein includes but is not limited to, a consensus tetratricopeptide repeat protein. In another aspect, a representative mechanical adhesive includes but is not limited to a hook-and-loop adhesive. In this embodiment and aspects thereof the monostable adhesive interface may comprise a combination of the self-assembling protein and the mechanical adhesive in each adhesive layer in a cross-scale formation.

In another embodiment of the present invention, there is provided a self-repairing composite material, comprising a layered assembly of at least one deformable adhesive material and a magnetic material.

In this embodiment, the deformable adhesive material may be a non-linear adhesive material. Particularly, the non-linear adhesive material may be a self-assembling protein or a mechanical adhesive or a combination thereof. In one aspect, the self-assembling protein may be a consensus tetratricopeptide repeat protein. In another aspect, the mechanical adhesive may be a hook-and-loop adhesive.

In this embodiment and aspects thereof, the non-linear adhesive material may comprise a sacrificial bond interface. In yet another aspect, the sacrificial bond interface is a cross-scale interface comprising the combination of the self-assembling protein and the mechanical adhesive. Also in this embodiment and aspects thereof, the sacrificial bond interface may be deformable upon application of an external load and self-assembling upon removal thereof.

In yet another embodiment of the present invention, there is provided a method for constructing a sacrificial bond composite material, comprising preparing a sacrificial bond interface; and arranging a magnetic material and the sacrificial bond interface into a plurality of alternating layers. Further to this embodiment, the method comprises incorporating the sacrificial bond composite material into or onto a textile or other composite material.

In both embodiments, the sacrificial bond interface may comprise at least one deformable adhesive material. Particularly, the deformable adhesive material may be a non-linear self-assembling protein or a mechanical adhesive or a combination thereof. In aspects thereof, the non-linear self-assembling protein or a mechanical adhesive may be as described supra. In another aspect, the method may comprise arranging the magnetic material with the sacrificial bond interface comprising a non-linear self-assembling protein and a mechanical adhesive to construct a cross-scale sacrificial bond composite material.

In yet another embodiment of the present invention, there is provided a sacrificial bond composite material constructed by the method as described supra. In this embodiment, the sacrificial bond interface is monostable and self-healing.

Provided herein are sacrificial bond composites (SBCs) which are monostable and deformable with high energy dissipation and autonomous self-repairing or self-healing capabilities. The sacrificial bond composites comprise sacrificial bond interfaces and magnetic elements or magnetic materials arranged in multiple or a plurality of layers. The sacrificial bond interfaces comprise adhesive materials such as self-assembling proteins or mechanical adhesives or a combination thereof. The self-assembling proteins may be non-linear proteins such as, but not limited to, consensus tetratricopeptide repeat protein (CTRP), and the mechanical adhesive may be, but is not limited to, a hook-and-loop adhesive.

The adhesive materials that are self-assembling proteins are useful to construct nanoscale sacrificial bond composites and the mechanical adhesives recreate similar mechanical responses at the mesoscale. Sacrificial bond interfaces that comprise both self-assemblying proteins and mechanical adhesives are used in cross-scale sacrificial bond composites. The arrangement of magnetic layers within the sacrificial bond composites enables them to recover from an external load, such as causing a fracture, by combining magnetic recovery and the high reconfigurability of sacrificial bonds upon removal of the external load at room temperature.

Protein-based sacrificial bond composites are able to dissipate energy until their interfaces experience strains up to 600% and, after the external load dissipates, recover a ~70% of their original tensile strength in 1 h owing to the moisture-induced self-assembly of new sacrificial bonds joining the delaminated interfaces. Mechanical adhesive-based sacrificial bond composites are able to rapidly restore their sacrificial hook-and-loop bonds, allowing them to recover a ~85% of their original tensile strength when the magnetic recovery of the composite brings its delaminated interfaces back into contact. The rapid formation of sacrificial bonds endows sacrificial bond composites with high energy dissipation along multiple loading and unloading cycles.

Thus, sacrificial bond composites may be incorporated into or built into other materials to improve sustainability, resiliency and durability. The sacrificial bond interfaces may improve the mechanical performance of existing materials and composites. Non-limiting examples are durable structural materials, tough textiles, and protective equipment.

The following examples are given for the purpose of illustrating various embodiments of the invention and are not meant to limit the present invention in any fashion.

Example 1

Methods and Materials

Sacrificial Bond-Based Interfaces

Protein-based interfaces were fabricated by mixing citric acid (1% w/v), PEG-400 (4% w/v), and beef gelatin powder (5% w/v; Aspen Naturals) with a 300 mM CTPR solution in deionized (DI) water. In this solution, PEG and citric acid (both from Sigma Aldrich) serve as a plasticizer and an antibacterial agent, respectively. CTPR proteins were synthesized following previously described protocols (39,40). Mechanical adhesive-based interfaces were fabricated by gluing 24.5 mm×40 mm (Area=980 mm) hook-and-loop surfaces (VELCRO) to the opposite faces of the 3D printed supports using a cyanoacrylate adhesive (Loctite 409; Henkel Ltd.).

Magnetic Recovery Interfaces

The magnetic recovery layers were constructed using two opposite-facing parallel Neodymium (grade N10; USA Rare Earth LLC.) cuboidal magnets (1"×1"×⅛"). During the mechanical characterization, the magnetic elements were housed inside a 3D-printed support.

Mechanical Characterization

Mechanical characterization experiments were conducted in a universal tensile testing machine (ESM1500; Mark10 Corp.) equipped with a 100 N load cell (model MR011000) at a loading rate of 3 mm/min. Non-stretchable braided polyethylene threads (0.8 mm O.D. Calamus Inc.) were used to transfer the tensile force to adjacent interfaces and maintain the stacked interfaces parallel during the test. An aluminum rail was used to constrain the movement of the interfaces, restricting their rotation in all directions, and enabling movement solely in the vertical axis.

Example 2

Cross-Scale Design of Self-Repairing Interfaces Based on Sacrificial Bonds

Energy Dissipation Mechanism of Sacrificial Bond-Based Interfaces Across Scales

At the nanometer scale, proteins such as Lustrin A or chitin self-assemble into an array of loops secured by sacrificial bonds (29,30). Upon stretching, these proteins unfold their hidden length after the sequential breaking of their sacrificial bonds (31). Therefore, the total energy required to break to unfold the protein is equal to the sum of the energy required to break each of its sacrificial bonds. Similarly, the maximum strain of the protein is equal to the sum of the hidden lengths in the loops of the protein (13).

To better visualize this efficient energy dissipation mechanism, FIG. 1A shows the schematic representation of three proteins that fail under the same tensile force: a short protein, a long protein, and a self-folding protein with sacrificial bonds. Comparing their respective force-extension curves (FIG. 1B), the short protein fails after a low extension, exhibiting a low dissipation energy density (measured as the area below the force-extension curve). The long protein behaves as an entropic spring, dissipating a higher amount of energy during its straightening. Finally, the self-folding protein with sacrificial bonds dissipates the largest amount of energy, as it requires energy to tighten up, to break each of the sacrificial bonds, and to unfold the released hidden lengths. Additionally, the distribution of hydrophobic and hydrophilic domains across the structure of proteins with sacrificial bonds endows them with the capability to self-fold in presence of moisture, allowing for the reforming of the sacrificial bonds after the unfolded protein is free from the external force. This self-repairing capability imparts nacre with its well-known ability to self-heal after mechanical damage (32).

Figure 1B:
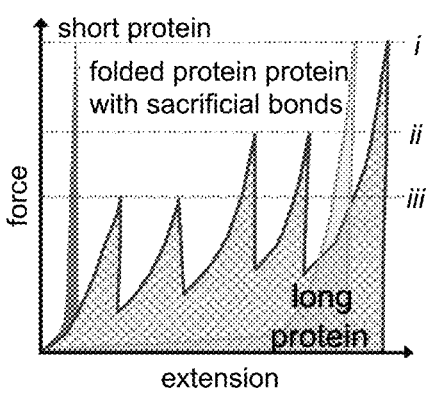
Figure 1C:
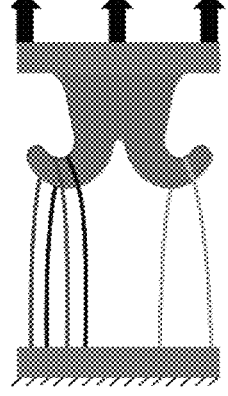
Figure 1D:
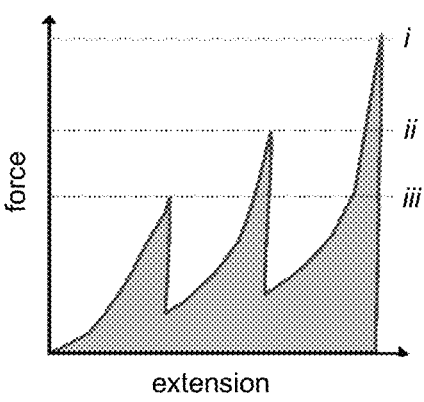

FIGS. 1C-1D show how mechanical adhesives are able to recreate, at the mesoscale, the mechanical performance of sacrificial bond-based interfaces using reconfigurable hook-and-loop bonds. [27] Under an external tensile force, the elasticity of the hooks and loops allows these bonds to stretch, mimicking the energy dissipation mechanism of unfolding proteins with hidden lengths. [21] After the mechanical adhesive interfaces delaminates, it is only necessary to bring the hook and loop surfaces of the interface back into contact so that the hook-and-loop bonds can rapidly reform at room temperature.

Fabrication of Self-Repairing SBCs Using Monostable Interfaces

Figure 2A:
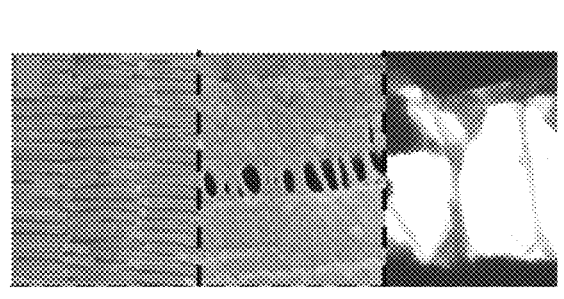
FIGS. 2A-2F show sacrificial bond-based interfaces for the fabrication of sacrificial bond composites across scales.
Figure 2B:
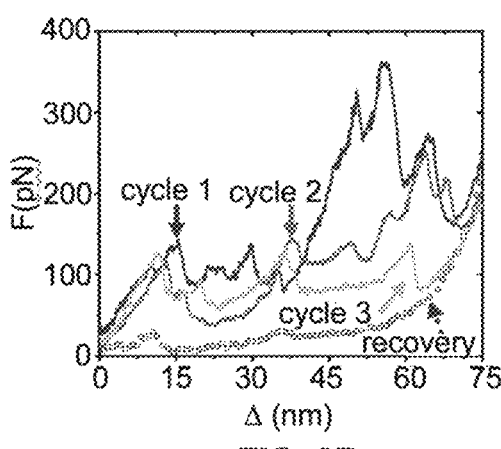

FIGS. 2A-2B show the self-healing properties of nacre, a natural sacrificial bond composite, under cycling loading conditions. Scanning electron imaging reveal how the ~500 nm-thick aragonite platelets in nacre efficiently distribute external forces across the biopolymer adhesive joining their interfaces (32). This adhesive interface unfolds into biopolymer fibrils upon elongation, exhibiting a mechanical behavior similar to that of folded proteins with sacrificial bonds (FIGS. 1A-1B). The biopolymer fibrils of these interfaces can restore their folded configuration in the presence of moisture, providing self-healing properties to nacre (33). To be able to self-heal, however, the aragonite platelets require to be brought back in contact, which only allows nacre to recover after strains below 5% (34). Considering the properties of nacre, two approaches for the fabrication of large-strain, self-repairing composites based on interfaces with sacrificial bonds were examined.

Figure 2C:
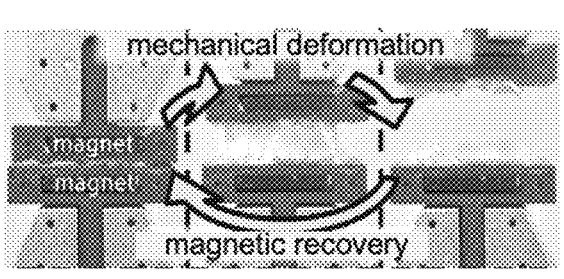
Figure 2D:
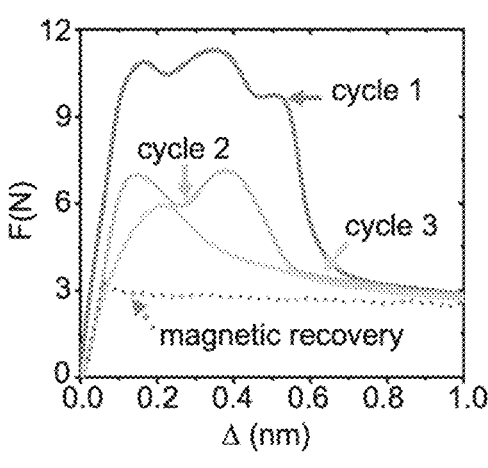

Firstly, the combination of magnetic elements with adhesives based on self-assembling proteins (FIGS. 2C-2D) was utilized. These SBCs were fabricated by embedding opposite-facing magnets into flat 3D printed plates and incorporating a 100-μm-thick protein film rich in consensus tetratricopeptide repeat (CTPR) self-assembling protein (35). When exposed to several tensile loading cycles, the protein-based interfaces undergo significant deformation (strain at fracture, $\varepsilon_f$=603%) due to the formation of stretchable fibrils connecting the 3D printed plates (FIG. 2C). Even after full mechanical failure, when the tensile load dissipates, the magnetic attraction between the plates is able to bring the interface back in contact. Due to the self-assembling capabilities of CTPR protein films, these sacrificial bond composites are able to autonomously recover 70% of their original tensile strength in 1 h at 22° C. and 40% relative humidity (FIG. 2D).

Figure 2E:
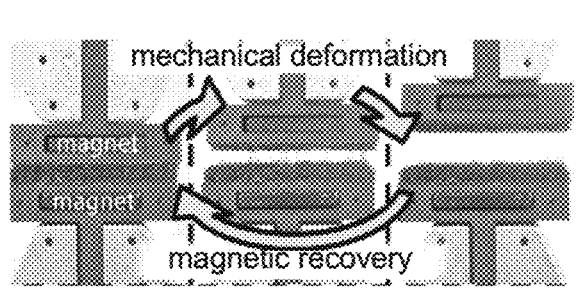
Figure 2F:
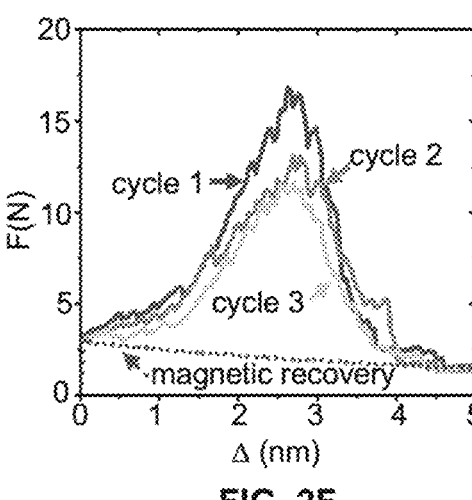

To create sacrificial bond composites capable of recovering their tensile strength even faster, the use of mechanical adhesives as sacrificial bond-based interfaces was examined. FIGS. 2E-2F show how sacrificial bond composites using hook-and-loop mechanical adhesive interfaces exhibit a mechanical behavior similar to nacre (FIGS. 2A-2B) and sacrificial bond composites with self-assembling protein-based interfaces (FIGS. 2C-2D). Under external loads, the shorter loops in the mechanical adhesive interface dominate the initial force-extension response of the sacrificial bond composite (FIG. 2F), while longer loops endure the loading forces upon larger deformation, increasing the total energy dissipated by the interface. The rapid reconfiguration of the hook-and-loop bonds when both sides of the interface are brought back in contact by the magnetic recovery of these sacrificial bond composites allows the interface to regaining 85% of its tensile strength in less than 1 s even after its complete delamination ($\varepsilon_f$=325%).

Example 3

Analytical Model Describing the Mechanical Response of Self-Repairing SBCs

Figure 3A:
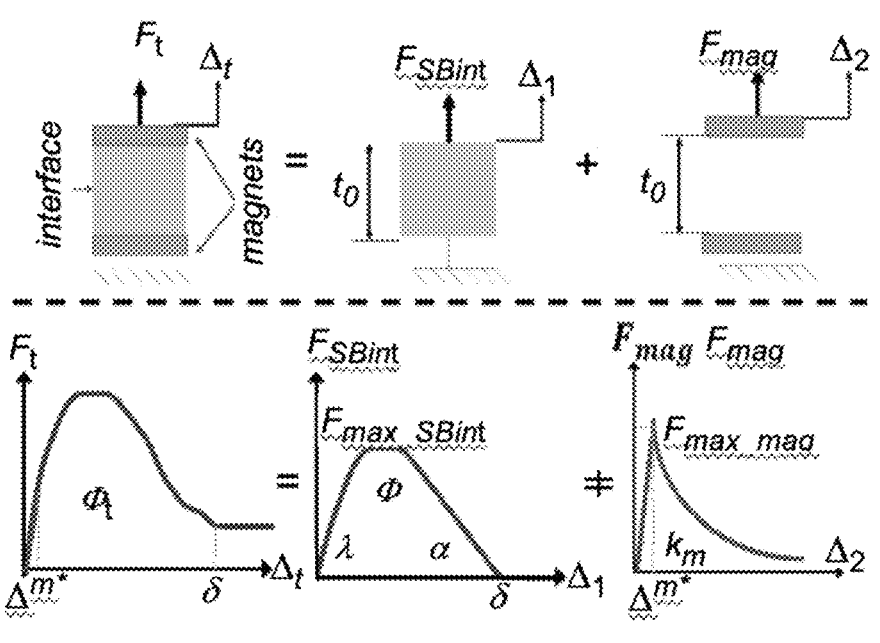
FIGS. 3A-3B are a description of the cross-scale analytical model used to predict the mechanical behavior of self-repairing interfaces based on sacrificial bonds.

FIG. 3A shows how the total reaction force ($F_t$) of sacrificial bond composites with magnetic recovery is calculated as the sum of the reaction force of the sacrificial bond-based interface ($F_{SBint}$) and the non-linear force required to increase the separation between the magnetic layers ($F_{mag}$). A potential-based cohesive model (PPR) was used to describe the nonlinear fracture of sacrificial bond-based interfaces due to its thermodynamic consistency and accuracy at reproducing experimental conditions (36,37). Upon normal tensile forces, the PPR model estimates the reaction force of the interface of any sacrificial bond composite as:

$$F_{SBint}(\Delta_1) = \frac{\Gamma A}{\delta}\left[ m\left(1 - \frac{\Delta_1}{\delta}\right)^{\alpha}\left(\frac{m}{\alpha} + \frac{\Delta_1}{\delta}\right)^{m-1} - \alpha\left(1 - \frac{\Delta_1}{\delta}\right)^{\alpha-1}\left(\frac{m}{\alpha} + \frac{\Delta_1}{\delta}\right)^{m}\right] \quad (1)$$

where $$\Gamma = -\phi\left(\frac{\alpha}{m}\right)^{m}$$

is an energy constant associated with the elastic deformation of the interface, $$m = \frac{\alpha(\alpha - 1)\lambda^2}{\left(1 - \alpha\lambda^2\right)}.$$

The constitutive parameters of the PPR model are: the shape parameter, $\alpha$; final crack opening width, $\delta$; initial slope indicator, $\lambda$; and the fracture energy, $\phi$.

The non-linearity of the magnetic force between the magnetic layers of the sacrificial bond composite is described by Equation 2, $$F_{mag}(\Delta_2) = \tag{2}$$
$$\frac{k_m \Delta_2}{2}\left(\frac{\Delta^{m*} - \Delta_2 + \epsilon}{|\Delta^{m*} - \Delta_2 + \epsilon|} + 1\right) - \frac{F_{max\_mag}(\Delta_2 - \Delta^{m*})}{2\Delta_2^2}\left(\frac{\Delta_2 - \Delta^{m*} + \epsilon}{|\Delta_2 - \Delta^{m*} + \epsilon|} + 1\right)$$

where the displacement to reach maximum reaction force from the magnets is given by $\Delta^{m*} = F_{max\_mag}(|k_m|^{-1})$.

Figure 3B:
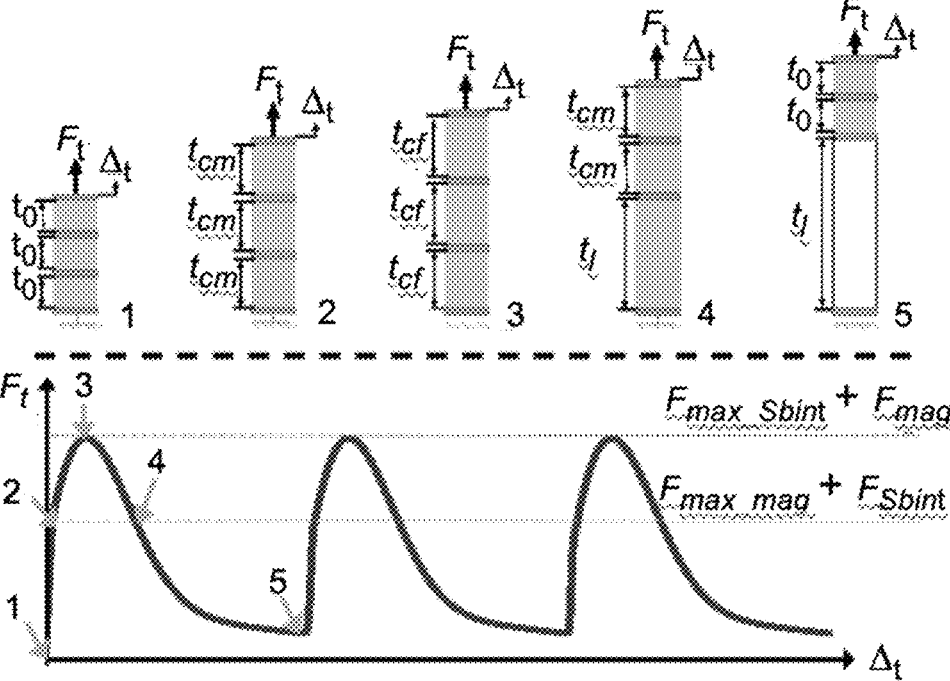

This model allows complex sacrificial bond composites comprising an arbitrary number of stacked sacrificial bond-based interfaces to be described as a superposition of the individual contribution of each of its constituents (FIG. 3B). The scalability of this model is in agreement with the accurate approximation of stacks linear adhesive layers as a series of springs and dampers connected in parallel.

During a multi-cycle displacement-control analysis, the stacked interfaces of the sacrificial bond composite deform gradually until the magnetic layers reach their maximum reactive force ($F_t = F_{max\_mag} + F_{SBint}$) at point 2 in FIG. 3B. After point 2 is reached, the magnetic reactive force starts to decrease, while the reactive force of the non-linear interface increases, reaching a maximum total reactive force of the sacrificial bond composite ($F_{tmax} = F_{max\_SBint} + F_{mag}$) at point 3 in FIG. 3B. If an infinitesimal displacement is applied at this point, the irregularities and defects at the interfaces trigger the onset of the delamination of the weakest interface (point 4), resulting in a sudden reduction of the reactive force. Once an interface delaminates, the external force is transferred to the remaining interfaces, which, one-by-one, repeat the described mechanical response (point 5).

Combining equations 1 and 2 according to $F_t(\Delta_t) = F_{SBint}(\Delta_1) + F_{mag}(\Delta_2)$ and $\Delta_t = \Delta_1 = \Delta_2$ by applying an iterative fitting algorithm to the experimental results obtained from the tensile test of single-layer sacrificial bond composites (FIGS. 4A-4E) finds the constitutive parameters of the model. First, the experimental parameters of the magnetic force exerted by the magnet without the sacrificial bond-based layer were obtained (FIG. 4A). Then, the tensile response of the protein-based and the mechanical adhesive-based interfaces without the magnets was characterized (FIGS. 4B, 4D). The constitutive parameters found with these characterization experiments are summarized in Table 1. These parameters allow the model to accurately reproduce the mechanical response of sacrificial bond-based interfaces with magnetic recovery (FIGS. 4C, 4E).

TABLE 1

Constitutive parameters of the analytical model for sacrificial bond composites

| Parameter | Self-assembled Protein Adhesive | Mechanical Adhesive |
|---|---|---|
| $\alpha_n$ | 9.0 [—] | 6.5 [—] |
| $\alpha_n$ | $0.01\left[\frac{N}{mm}\right]$ | $0.02\left[\frac{N}{mm}\right]$ |
| $\alpha_n$ | $0.2\left[\frac{N}{mm}\right]$ | $0.3\left[\frac{N}{mm}\right]$ |
| $\alpha_n$ | $5\left[\frac{N}{mm}\right]$ | $5\left[\frac{N}{mm}\right]$ |

Example 4

Fabrication of Multilayer Self-Repairing SBCs

Figure 5A:
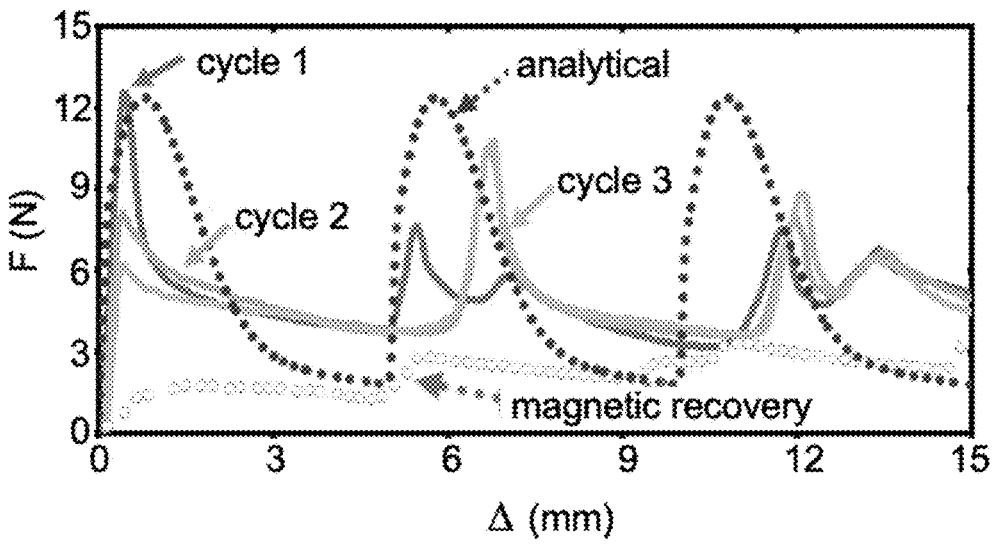
FIGS. 5A-5B show uniaxial tensile testing of multilayer sacrificial bond composites.
Figure 5B:
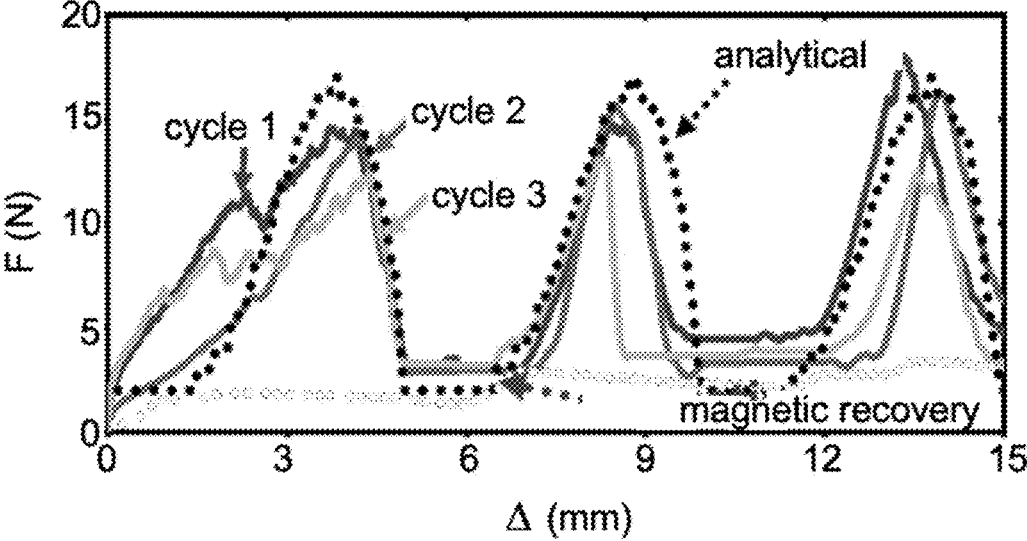

Sacrificial bond-based interfaces with magnetic recovery can be stacked to increase the energy dissipation of the composite (FIGS. 5A-5B). To maintain parallel alignment of both sides of the interface in the event of delamination, flexible yet non-stretchable polyethylene threads were utilized (FIG. 5A). The length of these threads matches the distance at which the sacrificial bond-based interfaces are completely separated, ensuring that the reaction force generated by the magnetic layers is enough to bring both sides of the interface back into contact (<1 s) once the external load dissipates. The magnetic recovery of multilayer SBCs allows the sacrificial bonds to re-form, self-repairing the composite as seen in FIGS. 2A-2E. After delamination, the threads keeping the interfaces parallel transfer the tensile force to the next interfaces, which undergoes a similar mechanical response, leading to force-extension curve with a number of maxima matching the number of interfaces. The presence of irregularities and defects across the sacrificial bond-based interfaces introduces variability in the interfacial adhesion, resulting in experimental deviations from the predicted mechanical response. This variability also causes the interfaces to not follow a pre-determined delamination order, as weaker interfaces (those with less sacrificial bonds) delaminate faster.

Example 5

Fabrication of Energy Absorbing Devices Using Sacrificial Bond Composites

Figure 6A:
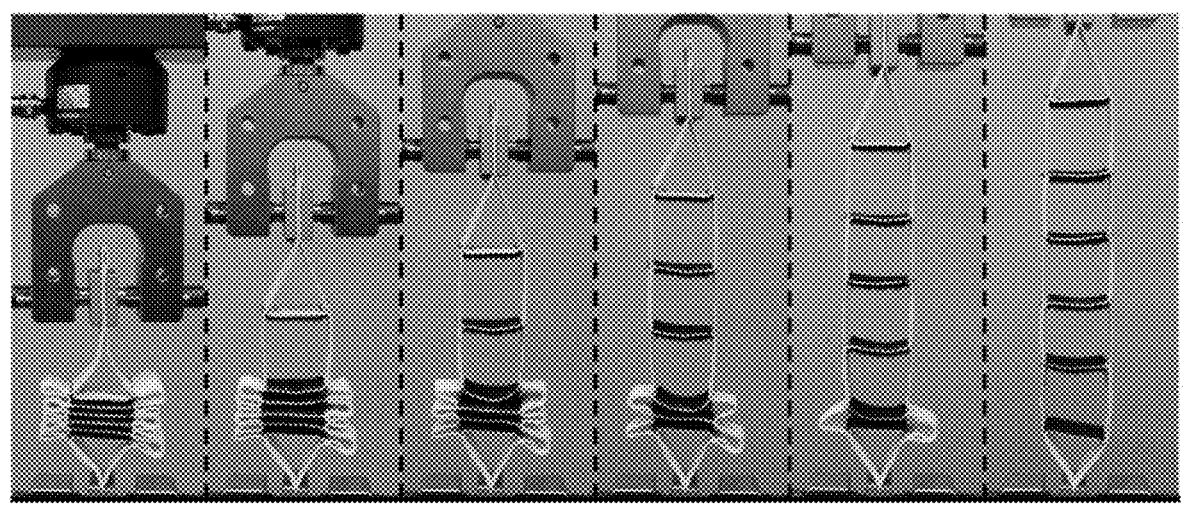
Figure 6B:
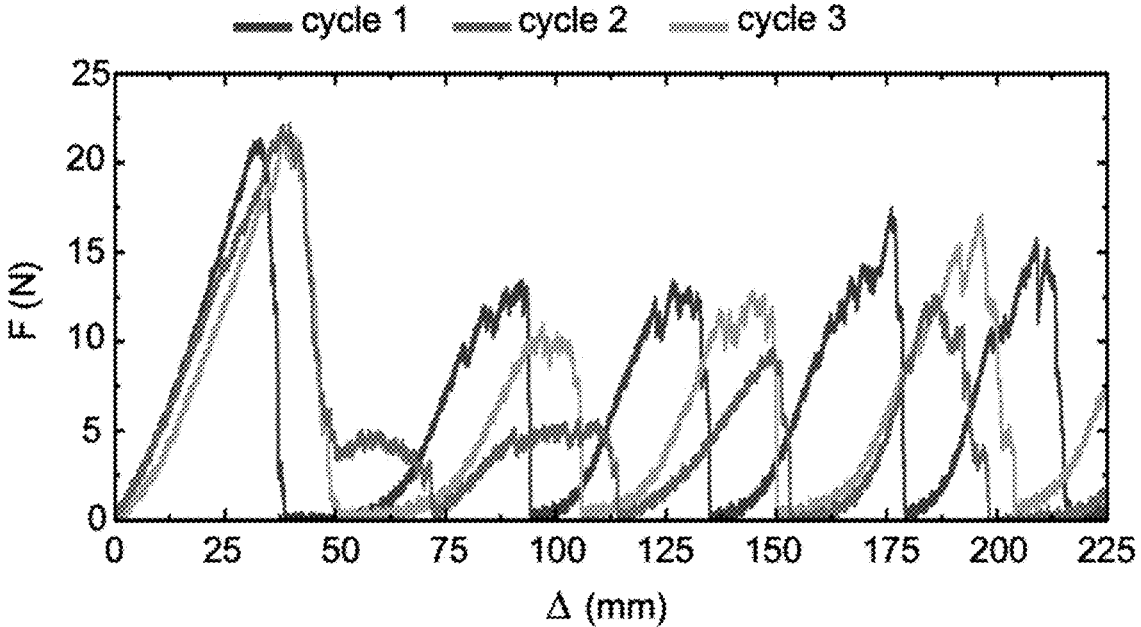

The capabilities of sacrificial bond composites to dissipate energy and self-repair are desirable for the development of new personal protective equipment and textiles. FIG. 6A presents a fall arrest system (FAS) that combines mechanical adhesive interfaces with flexible magnetic sheets to protect high-altitude workers. This fall arrest system aims to dissipate the energy generated during a fall, reducing the likelihood of the braking force to cause serious injuries to the user. Commercially available fall arrest systems typically comprise several web-based materials that tear partially upon a fall (38). The destructive approach used by these fall arrest system to dissipate energy makes them disposable and hard to customize. The proposed SBC-based fall arrest system is not only lightweight (85 g) but also reusable (over 100 cycles without significant degradation in performance), as it is capable of recovering the tensile strength provided by the hook-and-loop sacrificial loops in its mechanical adhesive interfaces after being deployed (FIG. 6B).

Exploiting the elastic recovery of woven fibers, FIG. 6C demonstrates how two-ply yarns fabricated with cotton-polyester microfibers infused with self-assembling CTPR exhibit the characteristic toughening mechanism of sacrificial bond composites. In this case, the sacrificial bonds are constituted by the self-assembled proteins (FIG. 6D) bridging the cotton fibers of the two threads of the yarn, which meet in every twist. Upon the application of an external pulling force, the sacrificial bonds break sequentially untwisting the yarn and storing elastic energy in its fibers. After the external force disappears, the elastic energy stored leads to the self-twisting of the yarn, which recovers its original shape. Hydrating the yarn using an air-atomized water spray allows the CTPR-based protein adhesive to re-form the sacrificial bonds across the yarn, which is able to recover its mechanical performance after it dries up in ~10 min (FIG. 6E).

REFERENCES

1. Chen et al. Prog. Mater. Sci. 57(8): 1492-1704, 2012.
2. Studart, A. R. Adv. Mater. 24(37): 5024-5044, 2012.
3. Jia et al. Mater. Des. 168:107650, 2019.
4. Munch et al. Science, 322(5907): 1516-1520, 2008.
5. Barthelat, F. J. Mech. Phys. Solids, 73:22-37, 2014.
6. Radi et al. Compos. Part B Eng. 183:107699, 2020.
7. Espinosa et al. Prog. Mater. Sci. 54(8): 1059-1100, 2009.
8. Nudelman et al. J. Struct. Biol. 153(2): 176-187, 2006.
9. Kakisawa, H.; Sumitomo, T. Sci. Technol. Adv. Mater. 12(6): 064710, 2011.
10. Rief, M. Science, 27(5304): 1295-1297, 1997.
11. Rief, M. Science, 27(5315): 1109-1112, 1997.
12. Oberhauser et al. Proc. Natl. Acad. Sci. 98(2): 468-472, 2001.
13. Fantner et al. Biophys. J. 90(4): 1411-1418, 2006.
14. Zhou et al. Chem. Soc. Rev. 46(20): 6301-6329, 2017.
15. Martikainen et al. Biomacromolecules, 14(8): 2531-2535, 2013.
16. Das, P.; Walther, A. Nanoscale, 5(19): 9348, 2013.
17. Byette et al. Biomacromolecules, 17(10): 3277-3286, 2016.
18. Thompson et al. Nature, 414(6865): 773-776, 2001.
19. Huang et al. Compos. Commun. 8:65-73, 2018.
20. Cavelier et al. Eur. J. Inorg. Chem. 2012(32): 5380-5389, 2012.
21. Zou et al. Extreme Mech. Lett. 43:101208, 2021.
22. Huang et al. Adv. Mater. 31(43): 1901561, 2019.
23. Ahn et al. Angew. Chem. 125(11): 3222-3226, 2013.
24. Hebeler et al. Geotext. Geomembr. 23(1): 77-105, 2005.
25. Vokoun et al. Smart Mater. Struct. 20(8): 085027, 2011.
26. Restrepo, V.; Martinez, R. V. Mater. Des. 205:109691, 2021.
27. Restrepo et al. J. Mech. Phys. Solids, 156:104600, 2021.
28. D'Elia et al. Sci. Rep. 2016, 6(1): 25059.
29. Shen et al. J. Biol. Chem. 1997, 272(51): 32472-32481.
30. Li et al. Proc. Natl. Acad. Sci. 2000, 97(12): 6527-6531.
31. Fantner et al. Nat. Mater. 4(8): 612-616, 2005.
32. Smith et al. Nature, 399(6738): 761-763, 1999.
33. Barthelat et al. J. Mech. Phys. Solids, 55(2): 306-337, 2007.
34. Gim et al. Nat. Commun. 10(1): 4822, 2019.
35. Romeo et al. Nanoscale Adv. 3(5): 1331-1341, 2021.
36. Park et al. J. Mech. Phys. Solids, 57(6): 891-908, 2009.
37. Park, K.; Paulino, G. H. Eng. Fract. Mech. 93:239-262, 2012.
38. Wong et al. Saf. Sci., 126:104663, 2020.
39. Sanchez-deAlcazar et al. Nanoscale Adv. (10): 3980-3991, 2019.
40. Cina et al. Chem. Eng. Trans. 93:169-174, 2022.

What is claimed is:

1. A self-repairing composite material, comprising:
a layered assembly of a consensus tetratricopeptide repeat protein and a magnetic material.

2. The self-repairing composite of claim 1, wherein the layered assembly further comprises a mechanical adhesive.

3. The self-repairing composite of claim 2, wherein the mechanical adhesive is a hook-and-loop adhesive.

4. The self-repairing composite of claim 1, wherein the consensus tetratricopeptide repeat protein comprises a sacrificial bond interface.

5. The self-healing composite of claim 4, wherein the sacrificial bond interface is a cross-scale interface comprising the consensus tetratricopeptide repeat protein and a mechanical adhesive.

6. The self-healing composite of claim 4, wherein the sacrificial bond interface is deformable upon application of an external load and self-assembling upon removal thereof.

7. A sacrificial bond composite material constructed by a method comprising:
preparing a sacrificial bond interface comprising at least a consensus tetratricopeptide repeat protein; and
arranging a magnetic material and the sacrificial bond interface into a plurality of alternating layers.

8. The sacrificial bond composite material of claim 7, wherein the sacrificial bond interface is monostable and self-healing.

9. The sacrificial bond composite material of claim 7, wherein the sacrificial bond interface further comprises a mechanical adhesive.

10. The sacrificial bond composite material of claim 9, wherein the mechanical adhesive is a hook-and-loop adhesive.

11. The sacrificial bond composite material of claim 9, wherein the arranging step in the method comprises arranging the magnetic material with the sacrificial bond interface that comprises the consensus tetratricopeptide repeat protein and the mechanical adhesive to construct a cross-scale sacrificial bond composite material.

* * * * *